June 9, 1942. H. O. HEM 2,285,927
SCALE COUNTERPOISE
Filed Jan. 3, 1940 2 Sheets-Sheet 2
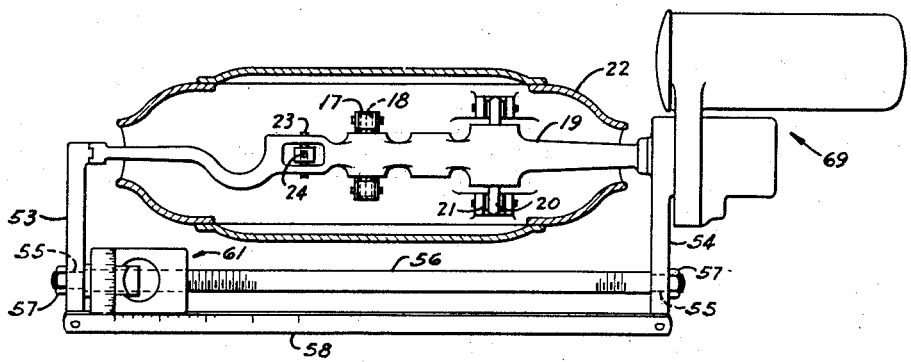
Fig. II
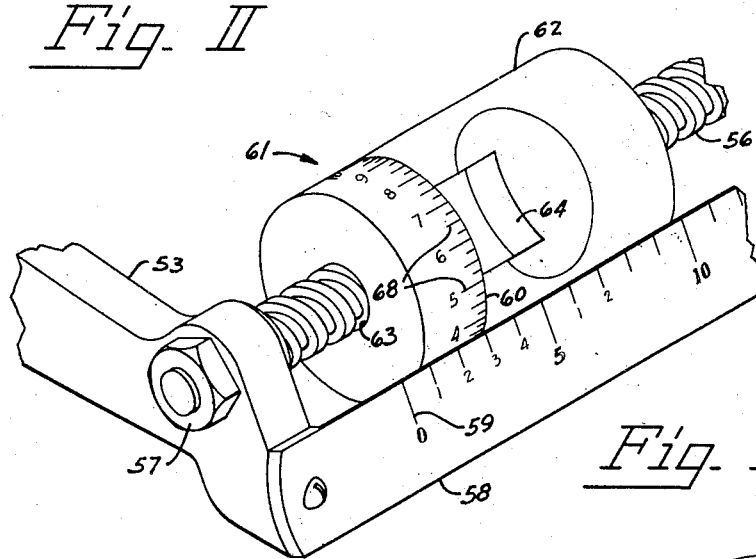
Fig. III
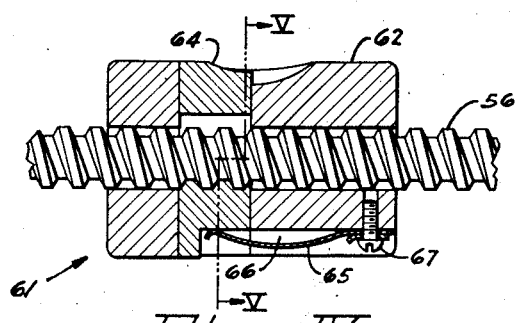
Fig. IV
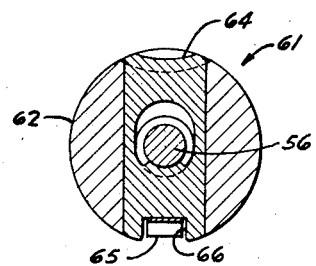
Fig. V
Halvor O. Hem
INVENTOR
BY Marshall & Marshall
ATTORNEYS Patented June 9, 1942

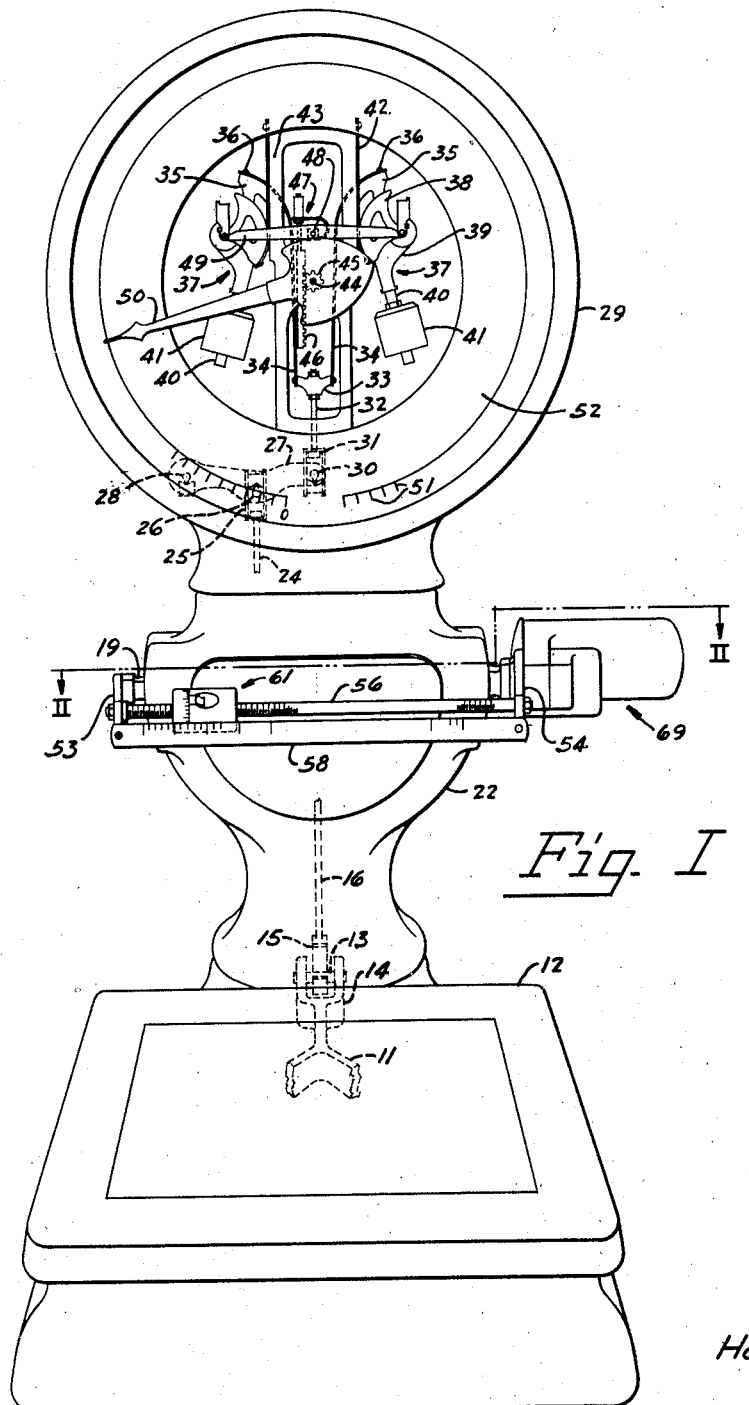
Fig. I

2,285,927

UNITED STATES PATENT OFFICE 2,285,927

SCALE COUNTERPOISE

Halvor O. Hem, Toledo, Ohio, assignor to Toledo Scale Company, a corporation of New Jersey Application January 3, 1940, Serial No. 312,197

5 Claims. (Cl. 265—49)

This invention relates generally to weighing scales, and more particularly to an improved load counterpoise for weighing scales and is in part a continuation of application Serial No. 235,832 filed October 19, 1938.

It is necessary that weighing operations in industrial and commercial concerns proceed speedily, accurately and with the least possibility of errors due to the human element. The necessary speed is generally attained by the use of automatically indicating scales.

For the purpose of offsetting the weight of boxes, barrels or other containers such scales are usually provided with auxilary load-offsetting means generally comprising two beams and poises, one of the beams being graduated to large increments of weight and the graduations on the other beam being the subdivisions of one of the large increments. Two beams usually are provided for the reason that the graduations on a single beam of the same capacity as the sum of the two would be too closely spaced for accurate observation. However, after correctly setting the poise the operator is very apt to make mistakes in addition or to forget to add one of the results; furthermore, hardened steel dogs or pawls are used as positioning means for these poises, these with careless operation are apt to wear away the metal of the beam especially at the positioning notches, thus causing additional errors. To obviate the necessity of two beams and poises, and still maintain the required spacing of graduations, it has been proposed to employ a so-called "micrometer" poise which consists of a main tubular body portion, mounted upon a conventional graduated beam, upon which a secondary or minor poise is mounted which is adapted to be screwed along the main body, its movement on the main body of the poise being equal to the distance between two graduations on the beam. Such a poise is illustrated and described in patent No. 2,013,934 to Waltz. While this poise effectively overcomes the necessity of two beams and poises it requires a conventional, graduated beam and positioning pawl; furthermore, the thread in the main body of the poise for advancing the micrometer portion is more or less of a delicate nature and thus subject to wear.

Accordingly, the principal object of the present invention is the provision of an improved micrometer counterpoise.

Another object is the provision of a threaded member of such size and contour as to eliminate the possibility of wear to the greatest extent.

Another object is the provision of improved means for constraining the movement of a micrometer poise along a threaded shaft; and, Still another object is the provision of improved means in a micrometer poise for selectively engaging and disengaging the threads of a threaded shaft.

These, and other objects and advantages will be apparent from the following description in which reference is had to the accompanying drawings, illustrating a preferred embodiment of the invention and wherein similar reference numerals refer to similar parts throughout the several views.

Referring to the drawings:

Fig. I is a perspective view of a scale of well known type embodying the invention.

Fig. II is a sectional plan view, the section being taken substantially along the line II—II of Fig. I.

Fig. III is an enlarged, fragmentary perspective view of the load counterpoise embodying the invention.

Fig. IV is an enlarged sectional view through the poise and showing a portion of the threaded shaft; and, Fig. V is a transverse section taken substantially along the line V—V of Fig. IV.

Referring to the drawings in detail:

The scale comprises a hollow base 10 which houses a conventional load supporting lever system 11 upon which, in the usual manner, is mounted a load platform 12. A pivot 13 in the nose 14 of the lever system 11 pivotally engages a stirrup 15 suspended from the lower end of a connecting rod 16 whose upper end, by means of a suitable stirrup 17, is suspended from a load pivot 18 (Fig. II) in a beam lever 19 fulcrumed by means of a pivot 20 upon suitable bearings 21 in the interior of an expanded portion of a hollow column 22. A power pivot 23, in spaced relation to the pivots 18 and 20 in the beam lever 19, is engaged by a suitable stirrup secured to the lower end of a connecting rod 24 whose upper end, by means of a stirrup 25, engages a load pivot 26 in a pendulum lever 27, fulcrumed at 28 upon suitable bearings in the interior of a substantially watchcase-shaped housing 29 which surmounts the column 22. The free end of this pendulum lever, by means of a power pivot 30, engages a stirrup 31 on the lower end of a short connecting rod 32, the upper end of which, locked to a crosshead 33, is clamped to the lower ends of flexible metallic ribbons 34 which overlie arcuate faces of power sectors 35 to whose upper ends these ribbons are clamped as at 36.

The power sectors 35 are component parts of load counterbalancing pendulums 37 which also comprise a pair of fulcrum sectors 38, a pendulum body 39, pendulum stems 40 and pendulum weights 41 which are adjustably threaded upon the stems 40. These pendulums, by means of flexible metallic ribbons 42, which overlie arcuate faces of the fulcrum sectors 38, to whose lower end they are fastened, are swingingly supported from a pendulum frame 43 which is fixedly stationed in the interior of the housing 29. Ball bearings, not particularly shown, mounted in flanges of the pendulum frame 43, support the ends of an indicator shaft 44. Teeth of a pinion 45 which is circumjacently mounted upon the shaft 44 engage teeth of a rack 46 which, by means of an adjustable member 47 and a shaft 48, is pivotally supported between two so-called compensating bars 49, the ends of which pivotally engage the pendulums 37 at their centers of revolution.

To indicate the weighing result, a forwardly extending end of the shaft 44 has clamped thereto an indicator 50 whose index cooperates with a series of weight indicia 51 on a chart 52 stationed in the housing 29 immediately in back of the indicator 50.

To the opposite ends of the beam lever 19, which project through openings in the column 22, are fastened brackets 53 and 54. These brackets extend forwardly of the column 22 and in suitable apertures support tenons 55 of a threaded shaft 56. Projecting portions of these tenons are threaded and lock nuts 57, threaded thereon, serve to lock shaft 56 immovably in position. To the outer ends of the brackets 53 and 54 is fastened a graduated beam 58 bearing a series of graduations 59 which represent major increments of weights of loads and which cooperate with an index line 60 engraved on a micrometer load offsetting poise 61 positioned on the threaded shaft 56. This poise comprises a body 62 having an axial bore 63 whose diameter is such that the body 62 may slide freely over the threads of the screw 56. The body 62 has a rectangular hole broached therethrough in which a block 64 is seated (Fig. IV). The block 64 is drilled and tapped to match the thread on the shaft 56 and the upper half of the thread is then removed by enlarging a portion of the hole. When the block 64 is seated in the broached hole in the body 62 and under the bias of a plate spring 65, which is fastened in a recess 66 in the body by a screw 67, the remaining portions of the threads in the block 64 engage the threads of the screw 56 and screw the poise 61 along the threaded shaft 56 when it is turned. But when the block 64 is pressed downwardly against the spring 65 the fragments of the threads in the block 64 disengage from the thread on the screw 56 and the poise 61 may be slid freely until the pressure is removed from the block 64 and its threads again engage the threads of the screw.

The weight of the poise 61 and the pitch of the threads on the shaft 50 are so calculated and designed that one revolution of the poise 61 about its axis advances it the distance between two adjacent graduations 59 on the beam 58 which in this example represents one pound. A series of graduations 68 extending peripherally about the poise represent subdivisions of a pound, for example ounces. It will be seen if the distance between two of the graduations 59 on the beam 58 were subdivided sixteen times the graduations would be so closely spaced as to make accurate reading impossible. The initial graduation of the series 59 on the beam 58 is so located on the said beam that when the poise 61 is in the zero position on the threaded shaft 56, and the zero graduation of the series 68 is in registration with the upper edge of the beam, the zero graduation of the series 59 is in registration with the line 60 on the poise 61. Since the graduations 59 are spaced to correspond to the pitch of the thread, after disengaging and sliding the poise along the shaft 56 re-engagement with its threads again properly locates the poise in relation to the graduations 59.

When the zero graduation of the peripherally extending series 68 is in registration with the upper edge of the beam 58 and the threads are engaged, the line 60 will always be in registration with one of the graduations of the series 59.

For the purpose of counterbalancing the dead weight of the levers, platform and other mechanism a loading box 69 of conventional design is secured to the proper end of the beam lever 19.

Since the operation of automatically indicating scales of the type herein described is well known no further description appears necessary. The operation of the counterpoise structure which embodies the invention is as follows:

Assuming that the scale is unloaded and in balance and the indicator 50 points to the zero indicium on the chart 52, a load now placed on the platform 12 depresses the lever system 11 and the moment of this load is transmitted to the beam lever 19 through the connecting rod 16. The lever 19 rocks about its fulcrum on the pivots 20, and, through the mechanism hereinbefore described, rotates the indicator 50 until the automatic load counterbalancing pendulums 37 exactly offset the load. The indicator now indicates this load. In the present example, if this load represents a container to be offset the operator exerts pressure on the block 64 of the poise 61 against the bias of the spring 65 until the portion of the threads in this block become entirely disengaged from the threads on the shaft 56. This permits him to slide the poise rapidly over the threads. This he proceeds to do until the poise is in such a position that it substantially counterbalances the load on the platform; he then releases the pressure on the block 64 permitting the bias of the spring 65 to urge the block 64 into re-engagement with the threads on the shaft 56. It is unlikely that in this position the poise exactly counterbalances the load and this fact is shown by the position of the indicator 50 with respect to the zero graduation on the chart and the operator now turns the poise screwing it in the proper direction until the indicator is exactly in registration with the zero indicium. That graduation of the series 59 on the beam 58 which is nearest to the index line 60, on the left thereof, indicates the weight in pounds and that graduation of the peripheral series 68 on the body of the poise nearest the upper graduated edge of the beam 58 represents the amount in fractions of a pound.

Although the object of the invention is only described herein as a tare poise in combination with an automatically indicating scale of relatively small capacity, it should be obvious that it may very advantageously be used as the main counterbalancing poise on beam scales having great counterbalancing capacities, or for any other purpose for which a load-offsetting counterpoise may be employed.

From the foregoing it will be seen that the embodiment of the invention herein shown and described is well adapted to fulfill all the objects primarily stated and it is to be regarded as illustrative only and it is to be understood that the invention is susceptible to variation, modification and change within the spirit and scope of the subjoined claims.

Having described the invention, I claim:

1. In a device of the class described, in combination, a beam graduated to indicate major units of weight, a threaded shaft in fixed relation to said beam, a poise rotatably mounted upon said shaft, an opening extending through said poise at right angles to the longitudinal axis of said shaft, a member mounted in said opening having a detent engageable with the threads of said shaft to prevent translation of said poise along said shaft while permitting helical movement of said poise upon said shaft, said detent being disengageable from said threads to permit said poise to slide along said shaft, and resilient means for urging the detent of said member mounted in said opening into engagement with the threads of said shaft, said poise having a peripheral series of graduations cooperating with a linear index on said graduated beam, said peripheral series of graduations comprising subdivisions of said major units of weight on said graduated beam.

2. In a device of the class described, in combination, a graduated beam, a threaded shaft in fixed relation to said beam, a poise rotatably mounted upon said shaft and a manually movable detent member connected to said poise and engageable with the threads of said shaft to prevent translation of said poise along said shaft while permitting rotative movement of said poise upon said shaft for advancing said poise along said shaft, said detent member being disengageable from said threads to permit said poise to slide along said shaft, said poise having a peripheral series of graduations cooperating with a linear index on said graduated beam.

3. In a device of the class described, in combination, a graduated beam, a threaded shaft fixed to said beam, a poise rotatably mounted upon said shaft and a detent member connected to said poise and engageable with the threads of said shaft to prevent translation of said poise along said shaft while permitting rotative movement of said poise upon said shaft for advancing said poise along said shaft, said detent member being disengageable from said threads to permit said poise to slide along said shaft, said poise having a peripheral series of graduations cooperating with a linear index on said graduated beam.

4. In a device of the class described, in combination, load receiving means and load counterpoising means cooperating therewith, said load counterpoising means including a beam, a threaded shaft in fixed relation to said beam, a poise mounted for movement upon said threaded shaft, said poise comprising a body having an opening extending therethrough for the reception of said threaded shaft, there being a second opening extending through said body at right angles to the axis of said first mentioned opening, a block mounted in said second opening, a detent on said block, and a spring secured to said body and cooperating with said block for urging said detent on said block into engagement with the thread of said threaded shaft, said detent being disengageable from said threads to permit said poise to slide along said shaft.

5. In a device of the class described, in combination, a graduated beam, a threaded shaft in fixed relation to said beam, a cylindrical load offsetting poise movably mounted upon said shaft and manipulative means cooperating with said cylindrical poise for selectively engaging and disengaging with threads of said threaded shaft, said beam and said cylindrical poise each having a series of indicia for cooperation with each other to indicate the amount of load offset by said poise.

HALVOR O. HEM.